(12) United States Patent
Brookler et al.

(10) Patent No.: US 10,733,189 B2
(45) Date of Patent: Aug. 4, 2020

(54) ERROR MESSAGE REDACTION IN QUERY PROCESSING

(71) Applicant: Microsoft Technology Licensing, LLC, Redmond, WA (US)

(72) Inventors: David Edward Brookler, Maalot (IL); Tomer Weisberg, Haifa (IL); Oren Yossef, Haifa (IL); Tomer Rotstein, Haifa (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 505 days.

(21) Appl. No.: 15/481,984

(22) Filed: Apr. 7, 2017

(65) Prior Publication Data
US 2018/0293238 A1 Oct. 11, 2018

(51) Int. Cl.
*G06F 16/2455* (2019.01)
*G06F 11/07* (2006.01)
(Continued)

(52) U.S. Cl.
CPC .... *G06F 16/24565* (2019.01); *G06F 11/0766* (2013.01); *G06F 16/2365* (2019.01);
(Continued)

(58) Field of Classification Search
CPC ........... G06F 16/24565; G06F 21/6227; G06F 21/00; G06F 16/2365; G06F 16/951; G06F 11/0766
(Continued)

(56) References Cited

U.S. PATENT DOCUMENTS 5,355,474 A * 10/1994 Thuraisngham ........ G06F 21/55
707/759
7,685,194 B2 * 3/2010 Kabra ................. G06F 21/6227
707/719
(Continued)

FOREIGN PATENT DOCUMENTS

WO 2006103656 A2 10/2006

OTHER PUBLICATIONS

Hafiz, et al., "Systematically Eradicating Data Injection Attacks using Security-oriented Program Transformations", in Proceedings of First International Symposium on Engineering Secure Software and Systems, Feb. 4, 2009, 15 pages.
(Continued)

*Primary Examiner* — Michael Pham
(74) *Attorney, Agent, or Firm* — Alleman Hall Creasman & Tuttle LLP

(57) ABSTRACT

Query processors often receive queries to be processed against a data set, such as by inserting user input into parameterized fields of a query template. Some queries may be manipulated by user input (e.g., injection attacks) to introduce intentional errors in the query, where the error message reveals a protected detail about the data set, such as the existence or number of records or tables, the data set schema, and/or the configuration of the query processor. Instead, when the processing of a query results in an error message that contains a protected detail about the data set (including the query processor), the error message may be redacted to redact the protected detail before providing a redacted error message that avoids revealing information that might otherwise be usable to exploit the contents of the data set and/or the integrity of the data processor.

18 Claims, 8 Drawing Sheets

(51) Int. Cl.
*G06F 16/951* (2019.01)
*G06F 16/23* (2019.01)
*G06F 21/62* (2013.01)
*G06F 21/00* (2013.01)

(52) U.S. Cl.
CPC ............ *G06F 16/951* (2019.01); *G06F 21/00* (2013.01); *G06F 21/6227* (2013.01)

(58) Field of Classification Search
USPC ........................................................ 707/690
See application file for complete search history.

(56) References Cited

U.S. PATENT DOCUMENTS

| | | | | |
|---|---|---|---|---|
| 7,860,768 | B2* | 12/2010 | Herter ................ | G06F 11/0709 705/35 |
| 7,913,167 | B2* | 3/2011 | Cottrille ............. | G06F 21/6245 715/271 |
| 8,024,339 | B2* | 9/2011 | Barker ................ | G06F 21/6245 707/736 |
| 8,739,278 | B2 | 5/2014 | Varghese | |
| 8,800,042 | B2 | 8/2014 | Sima et al. | |
| 2006/0184549 | A1* | 8/2006 | Rowney ............... | G06Q 10/107 |
| 2007/0074169 | A1 | 3/2007 | Chess et al. | |
| 2007/0168753 | A1* | 7/2007 | Herter ................ | G06F 11/0709 714/42 |
| 2008/0225748 | A1 | 9/2008 | Khemani et al. | |
| 2009/0100518 | A1* | 4/2009 | Overcash ............. | G06F 21/552 726/22 |
| 2009/0300774 | A1* | 12/2009 | Makkinejad .......... | G06F 21/629 726/27 |
| 2013/0346749 | A1* | 12/2013 | Wray .................. | H04L 63/1441 713/168 |
| 2015/0163242 | A1 | 6/2015 | Laidlaw et al. | |
| 2015/0379299 | A1* | 12/2015 | Klein .................. | G06F 21/6227 713/193 |

OTHER PUBLICATIONS

Tajpour, et al., "Evaluation of SQL Injection Detection and Prevention Techniques", in Proceedings of Second International Conference on Computational Intelligence, Communication Systems and Networks, Jul. 28, 2010, 7 pages.

Boyd, et al., "SQLrand: Preventing SQL Injection Attacks", in Proceedings of International Conference on Applied Cryptography and Network Security, Jun. 8, 2004, 11 pages.

Madan, et al., "Security Standards Perspective to Fortify Web Database Applications From Code Injection Attacks", in Proceedings of International Conference on Intelligent Systems, Modelling and Simulation, Jan. 27, 2010, pp. 226-230.

Baranwal, Abhishek Kumar, "Approaches to detect SQL injection and XSS in web applications", in Term Survey paper—EECE 571b, Apr. 2012, 12 pages.

Rowe, David Brodie, "Analysis of SQL injection prevention using a filtering proxy server", in Thesis of Rhodes University, Nov. 2005, 98 pages.

Hunt, Troy, "Everything you wanted to know about SQL injection (but were afraid to ask)", Published on: Jul. 29, 2013 Available at: https://www.troyhunt.com/everything-you-wanted-to-know-about-sql/.

* cited by examiner

ERROR MESSAGE REDACTION IN QUERY PROCESSING

BACKGROUND

Within the field of query processing, many query processors are provided that accept queries from a variety of sources, potentially including queries from unknown and/or untrusted sources. Queries may be specified in a query language, such as a variant of the Structured Query Language (SQL) or XPath, and may be processed against a data set such as the tables of an SQL database to generate and return a query result.

Many such scenarios involve data sets that are secured by various mechanisms, such as restrictions on which tables are available for querying; which records of a table may be queried and/or disclosed; and whether the schema of a particular table is available for inspection. For example, a customer of a service may be permitted to query the record of a Customers table that corresponds to the customer's account, but may not be permitted to access the records of any other customer. The restrictions over the data set may extend to metadata of the data set, such as the number of records in a table, whether or not a table or attribute with a particular name exists, and whether or not particular objects of the data set are protected by a security mechanism.

Administrators of the data set may seek to protect these properties from unauthorized access. For example, queries provided by untrusted users may be evaluated in a limited security context that restricts access to a particular data set, such as prohibiting access to tables that such users are not permitted to access. The evaluation of the query within these security constraints may block the user from inspecting or accessing properties of the data set that are to be withheld from the users.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In the context of data sets protected by a security policy, some users may seek to manipulate the query processor into revealing protected details, such as the existence, names, number, or values of records or tables; the schema of the data set; details about data objects of the data set such as user accounts, stored queries or procedures, or the security policy; and metadata about the query processor. In some cases, these protected details may be revealed in error messages that are generated as a result of errors in the query logic. As a first example, a query may be manipulated to cast a protected string variable as an integer, and the error message that is presented to describe the exception caused by the query may reveal the value of the protected string variable. As a second example, a query may be manipulated that prompts a security exception over a protected object, such as an attempt to delete a table that the user is not permitted to access. While the query processor may correctly refuse the request, the error message may correctly describe that the query could not be fulfilled over the requested table, and may therefore reveal the existence of a table with the specified name, as well as its protection by the security policy.

While many systems avoid the revelation of such information by restricting the types of queries that may be evaluated on behalf of users. However, one technique in which such queries may be presented involves injection. A parameterized query template is provided that is believed to be safe to execute is provided, where some fields of the query are fillable by parameters provided from users and are encapsulated from the rest of the query. A user may provide malformed user input that escapes the encapsulation, and may alter the logic of the query to invoke an error that produces a desired error message that reveals some protected details of the data set. Because users may be very creative when crafting injection techniques, it may not be possible to block all attempts to access protected details; therefore, further measures may be utilized to reduce the revelation of protected details through forced errors by the query processor.

Presented herein are techniques that may be utilized to protect a data set from such exploratory techniques. In accordance with these techniques, when a query processor evaluates a query to produce a query result, the query result may be returned on condition of no error arising during its evaluation. However, on condition of an error message arising from the processing of the query, the query processor may redact protected details from the error message, thereby generating a redacted error message that may be presented in response to the query. For example, the error message may be examined (e.g., by comparing the contents of the error message with the names of database symbols that comprise protected details) to determine whether the error message comprises any protected details before sending to the user. The redacted error message may therefore describe the error that resulted from the processing of the query without inadvertently revealing protected details of the data set that may otherwise be provided therein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
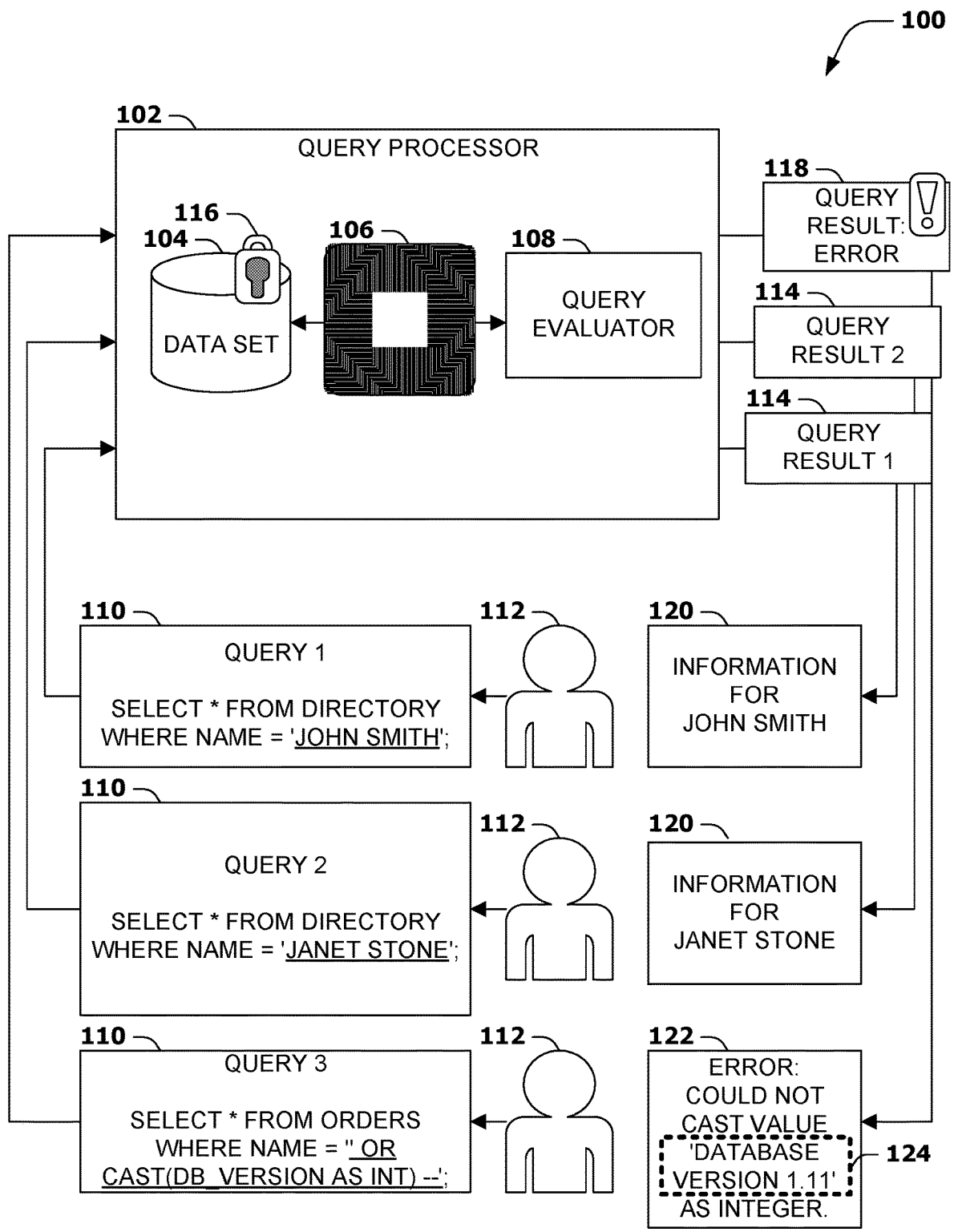
FIG. 1 is an illustration of an example scenario featuring an evaluation of a query against a data set.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

FIG. 1 is an illustration of an example scenario 100 featuring a query processor 102 that processes a query 110 against a data set 104 on behalf of a set of users 112.

In this example scenario 100, the query processor 102 comprises a processor 106 executing instructions that provide a query evaluator 108, and the queries 110 provide a set of logical operations to be applied by the query evaluator 108 against the data set 104 to produce a query result 114, such as a requested record set 120 that is responsive to the query 110, and the query result 114 may be returned to the users 112 to fulfill the query 110. In such scenarios, it may be desirable to limit the types of queries 110 that users 112 are permitted to execute against the data set 104. For instance, a customer of a service may be permitted to access a record of a Customers table of the data set 104 that represents the account of the customer, but not the records of any other customers represented in the Customers table of the data set 104.

As a first such example, a first user 112 is presented with a form that receives the first name and last name of the user 112. The user 112 may be permitted to provide user input to these fields, which may be inserted into a parameterized query 110, where the user input is encapsulated to identify different properties of the query 110. It may be additionally desirable to limit the records that the user 112 is permitted to query, and/or the query results 114 returned therefor. For instance, if the user 112 specifies his or her first and last name, the parameterized query 110 may first verify that this user 112 is permitted to access the identified record, and then return a query result 114 with the contents of the record. However, if the user 112 submits the name of a record that exists but that the user 112 is not permitted to access, the query processor 102 may return an error message 122 instead of a query result 114. In this manner, the query processor 102 may apply a security policy over the data set 104 for the queries 110 submitted by the users 112.

However, in some circumstances, a user 112 may attempt to explore portions of the data set 104 that are not authorized for inspection. If the user 112 submits a query 110 directly requesting the off-limits portion of the data set 104, the query processor 102 may return an error. However, in some scenarios, the user 112 may be capable of circumventing such protective measures. For instance, in the example scenario 100 of FIG. 1, a second user 112 submits data for the firm that specifies a first name and a last name. By entering malformed data for the first name field, the user 112 may cause a portion of the query 110 to generate an error, and to respond to the query 110 with an error message that may reveal a protected detail 116 about the data set 104.

One such example involves SQL injection, wherein the user 112 introduces an extra single quote or double quote into a string field that is typically encapsulated by single- or double-quotes, followed by instructions that invoke an error 118 and produce an error message 122. The premature interruption of the string value causes the following instructions to be executed rather than treated as string-type user input, and therefore procures an error message 122. While injection attacks are often avoidable, e.g., by "sanitizing" the data to remove extraneous symbols that escape the encapsulation of the parameter, an imperfectly secured data set 104 may fail to sanitize one or more parameters of a query 110 and therefore exhibit a vulnerability to a SQL injection attack. Other techniques may be utilized to modify a provided query 110, such as buffer overruns through other interaction with a device that may alter the instructions comprising the query 110, the query processor 102, and/or the data set 104.

While processing this malformed query, the query processor 102 may perform an operation that results in an error 118 involving a protected detail 116 of the data set 104. For example, the query 110 may specify a type conversion of a string variable representing the version of the data set 104 into an integer. Since this type conversion is invalid, the query processor 102 produces an error message 122 describing the nature of the error, which may generally be provided to assist developers in identifying the nature of the error. However, the error message 122 produced by the malformed query may include a description 124 of the protected detail 116 of the data set 104 (including the query processor 102), such as the string value of the data set version that could not be converted into an integer. In this manner, while the security policy of the data set 104 may restrict queries 110 from directly accessing and revealing the protected detail 116, the error message 122 returned to the user 112 from the malformed query 110 reveals the protected detail 116 of the data set 104 contrary to the security policy of the data set 104. The protected detail 116 may then be used by the user 112 to explore other properties of the data set 104, and/or to exploit security vulnerabilities in the data set 104, including the query processor 102. For example, the particular version of the data set 104 that is revealed in the error message 122 may exhibit a known vulnerability that is not present in earlier and/or later versions of the data set 104. By determining that the data set 104 is of a particular version, the user 112 may design an exploit of the data set 104 that relies upon the identified vulnerability, and may therefore gain further unauthorized access to the data set 104 (e.g., exploiting a buffer overrun vulnerability to insert additional instructions that, when invoked, elevate the privileges of the user 112, enabling the user 112 to retrieve any desired records from the data set 104, to insert new records, to alter or delete existing records, and/or to access administrative functions of the data set 104, including the query processor 102).

B. Presented Techniques

Figure 2:
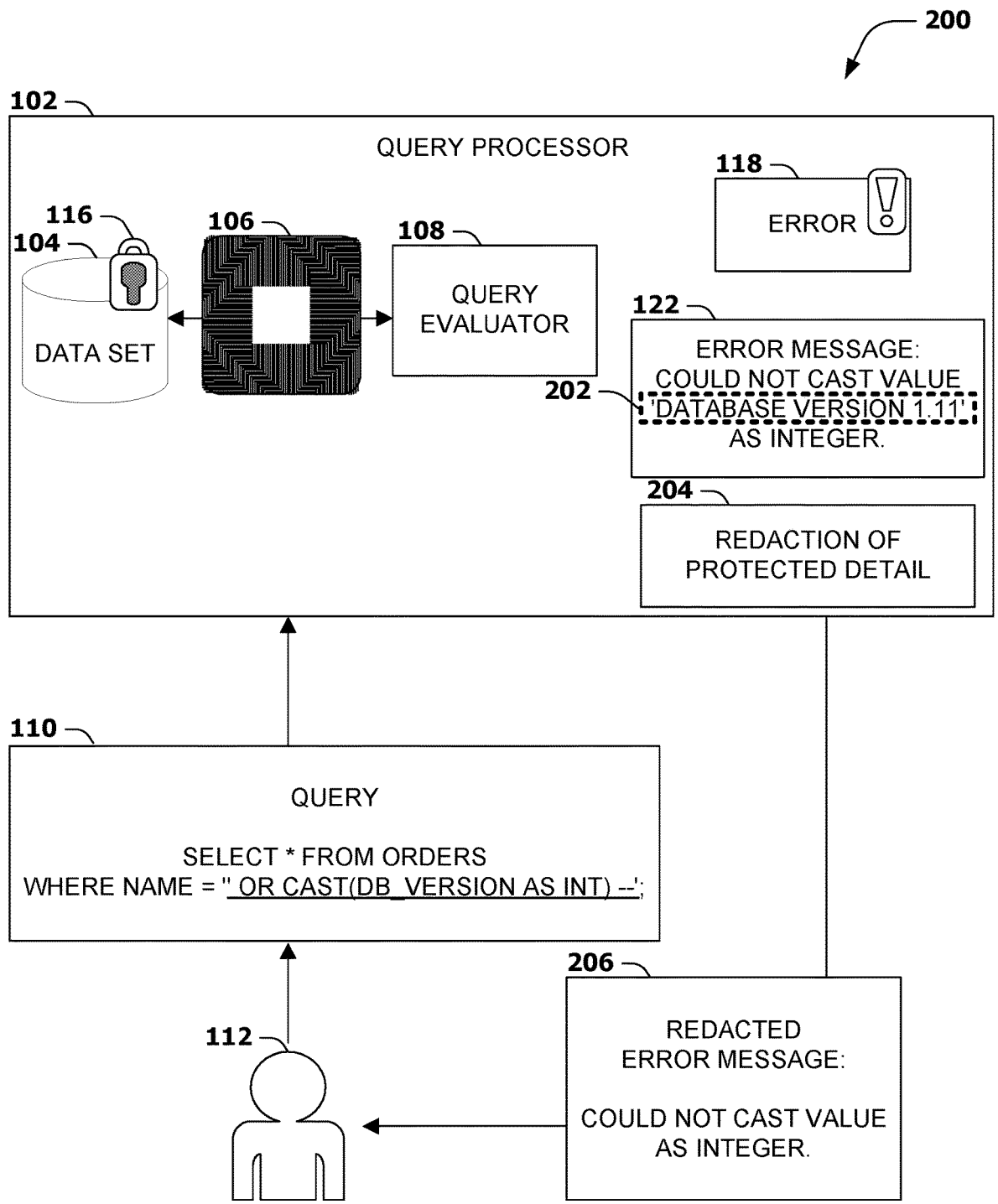
FIG. 2 is an illustration of an example scenario featuring an evaluation of a query against a data set, in accordance with the techniques presented herein.

FIG. 2 is an illustration of an example scenario 200 involving the evaluation of a query 110 in accordance with the techniques presented herein.

In this example scenario 200, a user 112 submits a query 110 to a query processor 102 for evaluation by a query evaluator 108 against a data set 104. The query 110 may be generated, e.g., by inserting user input received from the user 112 as parameters of a parameterized query 110, such as form fields that are inserted into encapsulated query slots of a query template. The query 110 presented by the user 112 includes an operation that intentionally produces an error 118 involving a protected detail 116 of the data set 104, and that produces an error message 122 with a description 124 of the error 118. In accordance with the techniques presented herein, instead of producing the error message 122 that reveals the protected detail 116, the query processor 102 may perform a redaction 204 of the error message 122 to produce a redacted error message 206 that does not include the protected detail 116. For example, before returning the error message 122, the query processor 102 may examine the description 124 of the error message 122 to identify the presence of protected details 116, such as a string that identifies the version of the data set 104. By presenting the redacted error message 206 instead of the error message 122 that reveals the protected detail 116 of the data set 104, the query processor 102 fulfills the query 110 of the user 112 while maintaining the security policy of the data set 104 in accordance with the techniques presented herein.

C. Technical Effects

The use of the techniques presented herein in the field of query processing may provide a variety of technical effects.

A first technical effect that may be achievable through the use of the techniques presented herein involves the consistent application of the security policy of the data set 104 and/or the query processor 102. The security policy may specify that some protected details 116 of the data set 104 are not to be available for inspection, but the vulnerabilities created in various queries 110 (e.g., SQL injection or buffer overflow exploits) may generate error messages 122 that expose such protected details 116 to users 112. The techniques presented herein may reduce or block such unauthorized inspection of the data set 104 and/or the query processor 102, and may therefore maintain the security policy thereover. Such protection may extend to the private data of other users 112 that may otherwise be revealed as the protected details 116 of the data set 104, such as contact information, passwords, credit card details, and private communications with other users.

A second technical effect that may be achievable through the use of the techniques presented herein involves the preservation of the resources of the query processor 102 and the data set 104. In such scenarios, the triggering of an error 118 often consumes resources, such as tracing an exception through a potentially complex exception hierarchy; logging the error 118 and the circumstances in which it occurred, such as a full stack trace; and notifying an administrator of the error 118. The resources consumed by the error 118, and particularly a large number of errors 118 that the user 112 may generate to probe various aspects of the data set 104, may consume a disproportionately large amount of resources. Because errors 118 in production environments are unexpected (especially a large volume of errors 118), administrators may not place any resource constraints around the errors 118 and the resources consumed thereby. The generation of errors 118 may therefore swamp an error log, potentially obscuring other errors 118 that an administrator may wish to identify and handle. In some circumstances, the generation of a large number of errors 118 may slow the performance of the query processor 102 or even cause the query processor to fail. The techniques presented herein may discourage users 112 from engaging in such techniques by redacting protected details 116 of the data set 104 and thereby discouraging users 112 from initiating errors 118 through the data set 104. Many such technical effects may be achievable through the use of the techniques presented herein.

D. Example Embodiments

Figure 3:
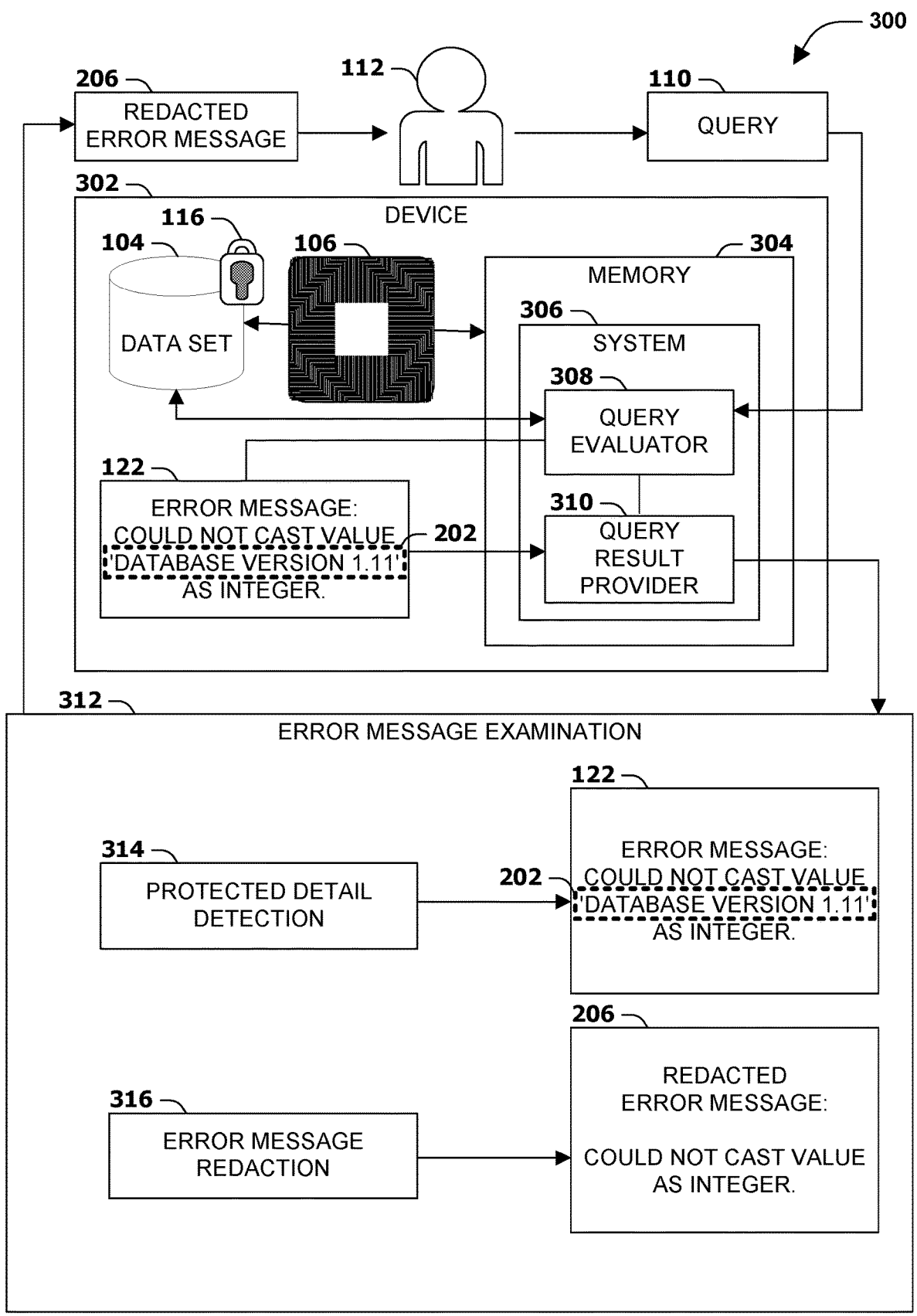
FIG. 3 is an illustration of an example scenario featuring an example system comprising an example device that evaluates of a query against a data set in accordance with the techniques presented herein.

FIG. 3 is an illustration of an example scenario 300 featuring some various embodiments of the techniques presented herein.

In this example scenario 300, an example device 302 operating as a query processor 102 receives a query 110 from a user 112 that is to be applied to a data set 104. The example device 302 comprises a processor 106 and a memory 304, such as a hardware nonvolatile and/or volatile memory device, or a hard disk drive, a solid-state storage device, storing instructions that, when executed by the processor 106, provide an example system 306 that evaluates the query 110 against the data set 104. The data set 104 also comprises a protected detail 116 that is intended to be inaccessible to at least some users 112 and queries 110 executed on behalf of such users 112.

The example system 306 comprises a query evaluator 308, which evaluates the query 110 to produce a query result 114. The example system 306 also includes a query result provider 310, which performs an error message examination 312 of the error message 122. On condition of the evaluation of the query 110 producing the query result 114 without an error 118, the query result provider 310 provides the query result 114 to the user 112 to fulfill the query 110. However, on condition of the evaluation of the query 110 producing an error message 122, the query result provider 310 redacts, from the error message 122, a protected detail 116 about the data set 120, to produce a redacted error message 206. For example, the query result provider 310 may perform a protected detail detection 314 over the description 124 of the error message a description 124 of the error message 122 to identify, in the description 124, a reference 202 to the protected detail 116 of the data set 104, and an error message redaction 316 that redacts the reference 202 from the error message 122 to produce the redacted error message 206. The query result provider 310 then provides the redacted error message 206 to the user 112 in response to the query 110. In this manner, the example device 302 and/or the example system 306 provided therein achieve the processing of the query 110, including the provision of error messages 122, in a manner that also maintains security over the protected detail 116 of the data set 104, in accordance with the techniques presented herein.

Figure 4:
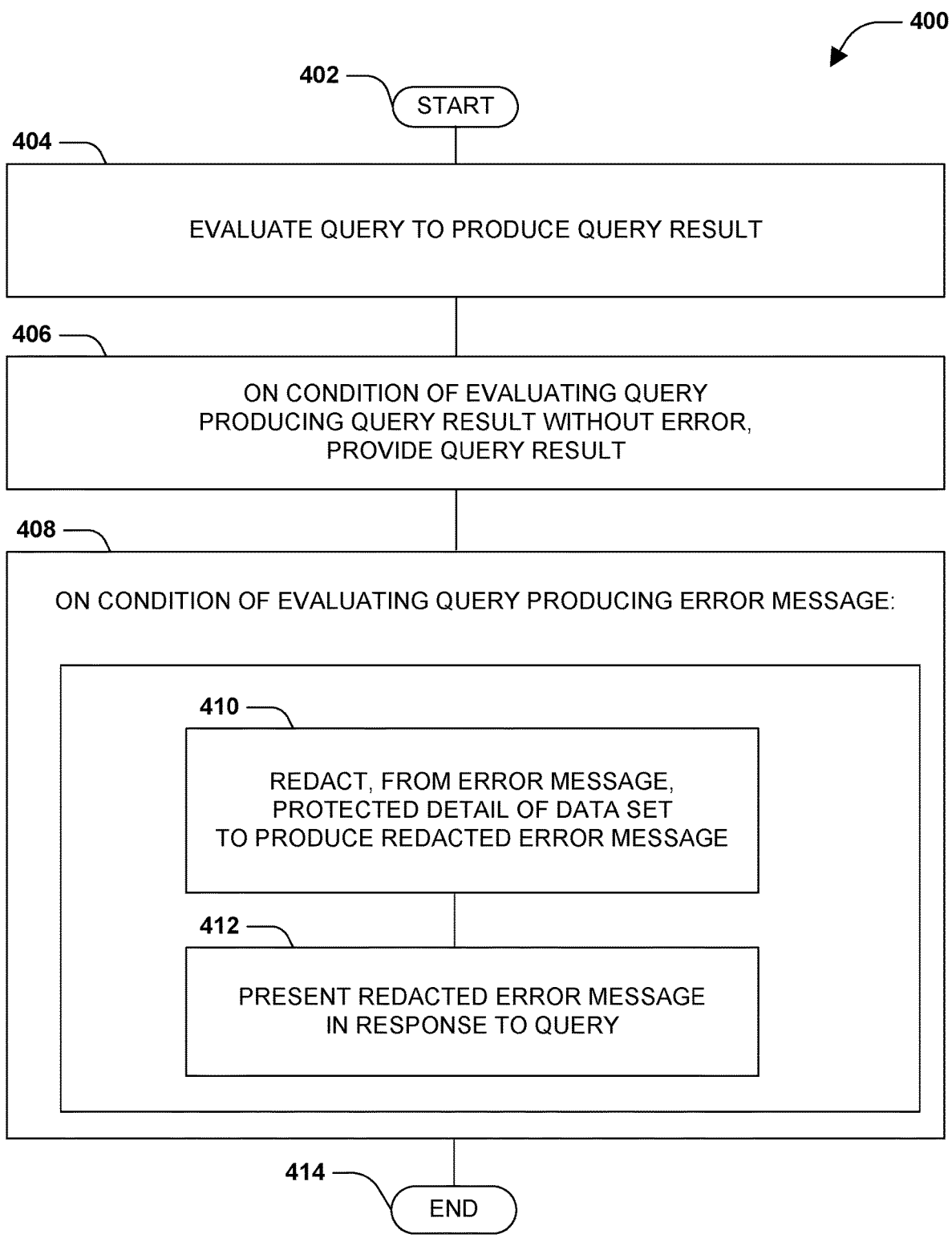
FIG. 4 is an illustration of a first example method of evaluating a query against a data set in accordance with the techniques presented herein.

FIG. 4 is an illustration of an example method 400 of causing a device 302 to evaluate a query 110 against a data set 104 in accordance with the techniques presented herein. The example method 400 involves a query processor 102 having a processor 106, and may be implemented, e.g., as a set of instructions stored in a memory 304 of the query processor 102, such as firmware, system memory, a hard disk drive, a solid-state storage component, or a magnetic or optical medium, wherein the execution of the instructions by the processor 106 causes the query processor 102 to operate in accordance with the techniques presented herein.

The example method 400 begins at 402 and involves executing the instructions on the processor 106. In particular, executing the instructions causes the query processor 102 to evaluate 404 the query 110 to produce the query result 114. On condition of the evaluation of the query 110 producing the query result 114 without an error 118, the execution of the instructions further causes the query processor 102 to provide 406 the query result 114. However, on condition 408 of the evaluation of the query 110 producing an error message 122 describing an error 118, the execution of the instructions may cause the device to redact 410, from the error message 122, a protected detail 116 about the data set 104, to produce a redacted error message 206; and to present 412 the redacted error message 206 in response to the query 110. Having achieved the processing of the query 110 without inadvertently revealing the protected detail 116 of the data set 104, the example method 400 enables the processing of the query 110 in accordance with the techniques presented herein, and so ends at 414.

Figure 5:
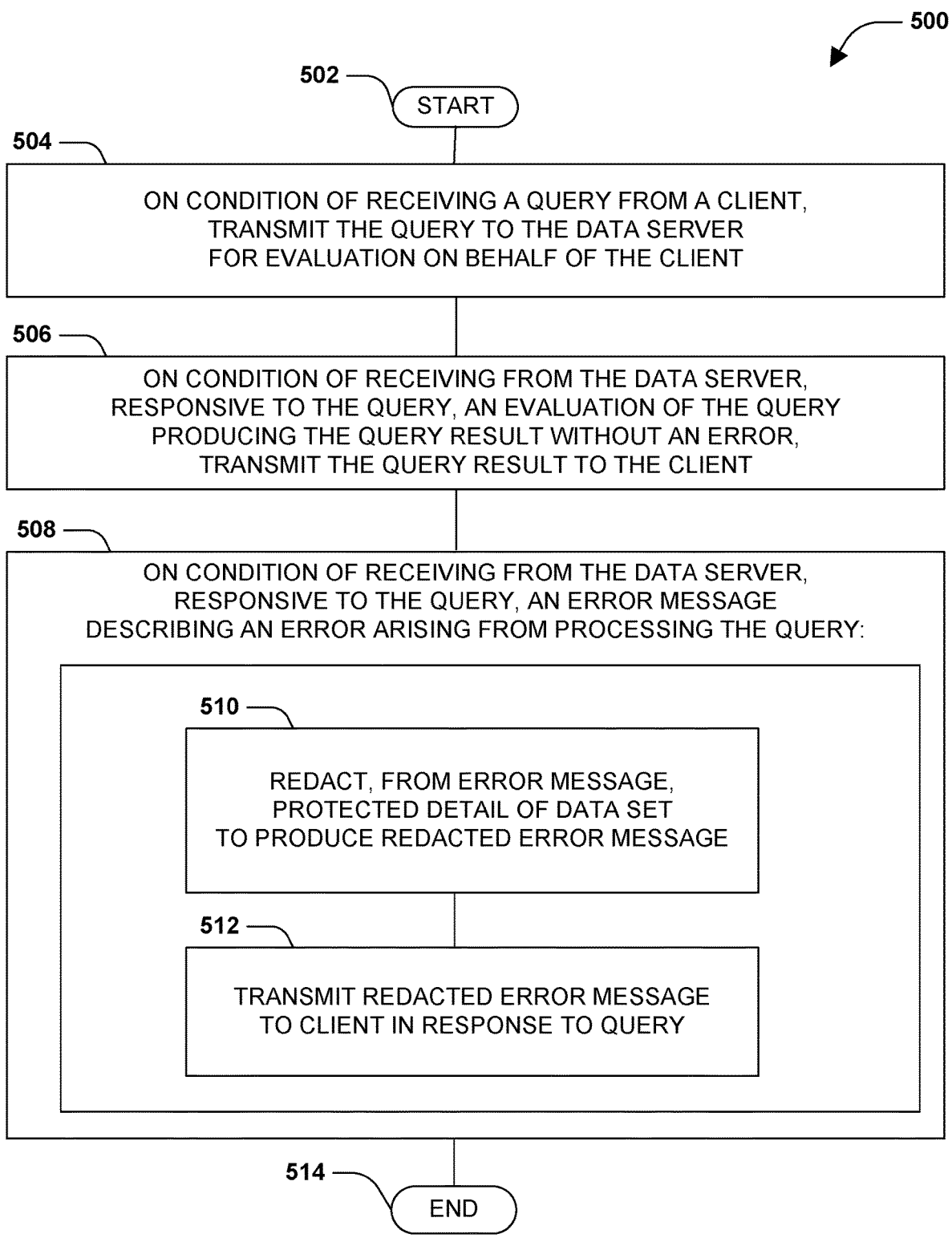
FIG. 5 is an illustration of a second example method of evaluating a query against a data set in accordance with the techniques presented herein.

FIG. 5 is an illustration of an example method 500 of causing a device 302 to evaluate queries 110 submitted by clients against a data set 104 managed by a data server, in accordance with the techniques presented herein. The example method 500 involves a query processor 102 having a processor 106, and may be implemented, e.g., as a set of instructions stored in a memory 304 of the query processor 102, such as firmware, system memory, a hard disk drive, a solid-state storage component, or a magnetic or optical medium, wherein the execution of the instructions by the processor 106 causes the query processor 102 to operate in accordance with the techniques presented herein.

The example method 500 begins at 502 and involves executing the instructions on the processor 106. In particular, executing the instructions causes the query processor 102 to, on condition of receiving a query 110 from a client, transmit 504 the query 110 to the data server for evaluation against the data set 104 on behalf of the client. On condition of receiving, from the data server and responsive to the query, an evaluation of the query 110 producing a query result 114 without an error 118, the execution of the instructions further causes the query processor 102 to transmit 506 the query result 114 to the client. However, on condition of receiving 508, from the data server and responsive to the query 110, an error message describing an error 118 arising from processing the query 110, the execution of the instructions may cause the device to redact 510, from the error message 122, a protected detail 116 about the data set 104, to produce a redacted error message 206; and to transmit 512 the redacted error message 206 to the client in response to the query 110. Having achieved the processing of the query 110 without inadvertently revealing the protected detail 116 of the data set 104, the example method 500 enables the processing of the query 110 through the data server in accordance with the techniques presented herein, and so ends at 514.

Still another embodiment involves a computer-readable medium comprising processor-executable instructions configured to apply the techniques presented herein. Such computer-readable media may include various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein. Such computer-readable media may also include (as a class of technologies that excludes communications media) computer-computer-readable memory devices, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein.

Figure 6:
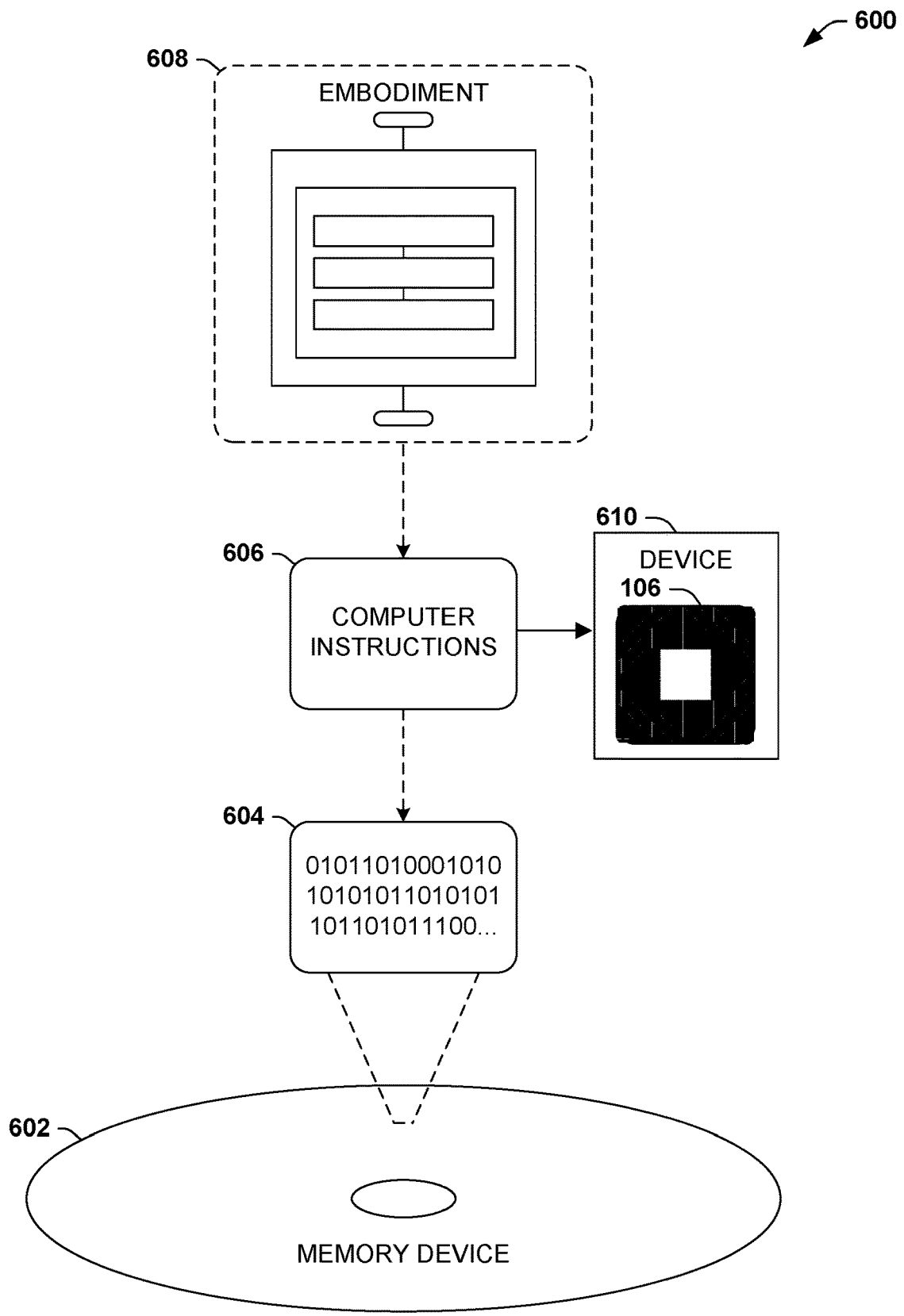
FIG. 6 is an illustration of an example computer-readable storage device storing instructions that cause a device to evaluate a query against a data set, in accordance with the techniques presented herein.

An example computer-readable medium that may be devised in these ways is illustrated in FIG. 6, wherein the implementation 600 comprises a computer-readable memory device 602 (e.g., a CD-R, DVD-R, or a platter of a hard disk drive), on which is encoded computer-readable data 604. This computer-readable data 604 in turn comprises a set of computer instructions 606 that, when executed on a processor 106 of a device 610, cause the device 610 to provide an embodiment 608 that operate according to the principles set forth herein. For example, the processor-executable instructions 606 may cause a device to evaluate queries 110 while redacting protected details 116 from error messages 122 from errors 118 arising therefrom, such as the example device 302 and/or the example system 306 in the example scenario 300 of FIG. 3. As another example, execution of the processor-executable instructions 606 may cause a device to perform a method of evaluating queries 110 while redacting protected details 116 from error messages 122 from errors 118 arising therefrom, such as the example method 400 FIG. 4. As another example, execution of the processor-executable instructions 606 may cause a device to submit queries to a data server on behalf of clients and to return query results while redacting protected details 116 from error messages 122 from errors 118 arising therefrom, such as the example method 500 FIG. 5. Many such computer-readable media may be devised by those of ordinary skill in the art that are configured to operate in accordance with the techniques presented herein.

E. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the example device 302 of FIG. 3; the example system 306 of FIG. 3; the example method 400 of FIG. 4; and/or the example computer-readable memory device 602 of FIG. 6) to confer individual and/or synergistic advantages upon such embodiments.

E1. Scenarios

A first aspect that may vary among embodiments of these techniques relates to the scenarios wherein such techniques may be utilized.

As a first variation of this first aspect, the techniques presented herein may be utilized on a variety of devices 302, such as servers, workstations, laptops, consoles, tablets, phones, portable media and/or game players, embedded systems, appliances, vehicles, and wearable devices. Such devices 302 may also include collections of devices, such as a distributed server farm that provides a plurality of servers, possibly in geographically distributed regions, that interoperate to process queries 110 against a data set 104. Such devices 302 may also service a variety of users 112, such as administrators, guests, customers, clients, and other applications and/or devices 302.

Additionally, the techniques presented herein may also be used with a variety of architectures. As a first such example, the data set 104 may exist on the same device as the query processor, and may serve one or more client applications executing on the same device and/or receiving queries from users of the device. As a second such example, the data set 104 may exist on a data server, and a device executing one or more client applications and/or receiving queries from one or more users may transmit the queries to the data server, receive responses, and present such responses to the clients. In this example, the techniques presented herein may be utilized on the data server before transmitting an error message to the device, and/or on the device on condition of receiving an error message from the server and before presenting the error message to the client applications and/or users. Still further distributions are also possible. For example, a first device may comprise a data server storing the data set, or a collection of servers storing portions of the data set in a distributed manner; a second device may comprise a query processor that applies queries to the data set, optionally comprising a collection of query processing processes and/or devices; and a third device may comprise an interface layer that receives queries from client applications and/or users, transmits such queries to the query processors, receives the results of the query evaluation, and transmits such results to the client applications and/or users. The techniques presented herein may be utilized in any of the devices of this scenario, optionally including multiple devices of this distributed architecture. The techniques presented herein may be utilized by any, including several, of the devices in such architectural variations in which the techniques presented herein may be applicable.

As a second variation of this first aspect, the techniques presented herein may be utilized with a variety of data sets 104, including databases specified in formats such as variants of the Structured Query Language (SQL); MapReduce data sets; document stores that store documents in various formats; file systems that store a hierarchical arrangement of files. Such data sets 104 may also be distributed, e.g., over a set of servers, within a local area network (LAN) and/or over a wide-area network (WAN) distributed over a potentially geographic area.

As a third variation of this first aspect, the techniques presented herein may be utilized with a variety of queries 110, such as queries 110 that create, read, update, and/or delete records of the data set 104; queries 110 that create, read, update, and/or delete the schema and/or structure of the data set 104; queries 110 that create, read, update, and/or delete various metadata and/or ancillary data objects of the data set 104, such as user accounts, stored queries or procedures, and/or security policies; and queries 110 that create, read, update, and/or delete extraneous properties of the device 302 hosting and/or accessing the data set 104 and/or the query processor 102, including data sets 104 other than the data set 104 that is nominally targeted by the query 110. Many such scenarios may be devised in which the techniques presented herein may be effectively utilized.

E2. Protected Details in Error Messages

A second aspect that may vary among embodiments of the techniques presented herein involves the types of error messages 122 with descriptions 124 that may reveal various protected details 116 of a data set 104.

As a first variation of this second aspect, the protected details 116 about the data set 104 that may be revealed in such error messages 122 include the existence, names, values, numbers, and interrelationships of records, tables, stored queries, stored procedures, and other data objects of the data set 104. As another example, the protected details 116 about the data set 104 may also involve the structure or schema of the data set 104, such as the interrelationships of the tables, and/or the usage of the data set 104, such as the existence and/or contents of access logs of users 112 with the data set 104. As another example, the protected details 116 about the data set 104 may include the details of the query processor 102 hosting the data set 104, such as its name, type, configuration, and/or location. As another example, the protected details 116 about the data set 104 may include the details of other data sets 104 that are stored and/or accessed by the query processor 102 hosting the data set 104.

As a second variation of this second aspect, the error 118 may further comprise a logical error arising from a logical operation applied to a value of the data set 104 (e.g., a logical AND operation applied to a string and an image), and the protected detail 116 revealed by the error message 122 may further comprise information about the value associated with the logical error.

As a third variation of this second aspect, the error 118 may further comprise a formatting error arising from a formatting request applied to a value of the data set 104 (e.g., a request to reformat an alphanumeric string as an integer), and the error message 122 may further reveal the existence of the value associated with the formatting error.

As a fourth variation of this second aspect, the error 118 may further comprise a resource error involving a resource of the query processor 102, and the protected detail 116 may be revealed as exploitable information about the query processor 102 arising from the resource error. For example, a request to access a particular object identified by a name may be denied as an access violation, but the access violation may nevertheless reveal that a protected resource exists with the specified name.

As a fifth variation of this second aspect, the error 118 may further comprise a relational error arising from a relational operation involving a relation between a first resource and a second resource (e.g., a dependency of a resource on another resource), and the protected detail 116 may be revealed as exploitable information about the relation between the first resource and the second resource.

Figure 7:
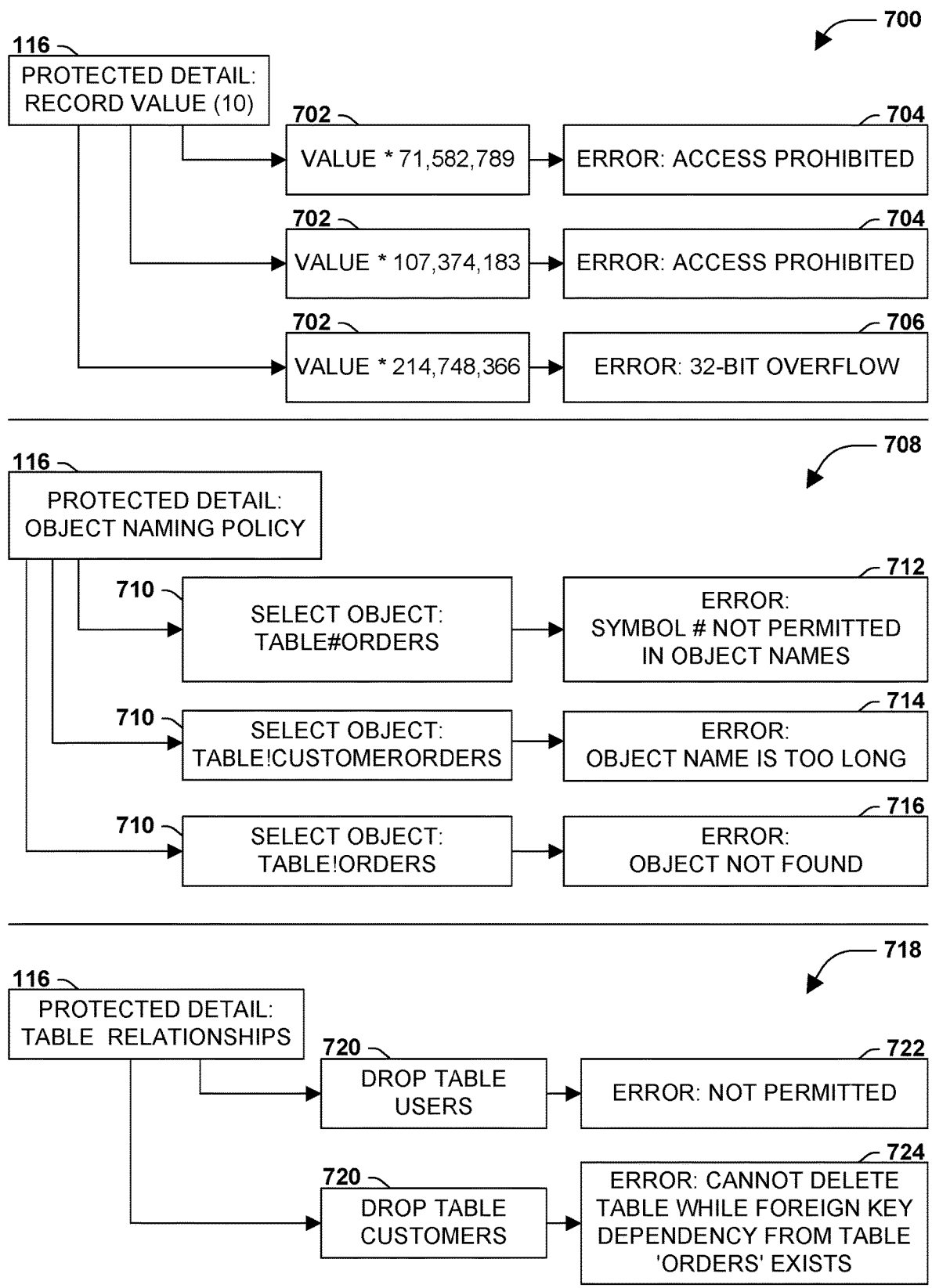
FIG. 7 is an illustration of various example scenarios featuring the presentation of error messages that reveal protected details about a data set, in accordance with the techniques presented herein.

FIG. 7 is an illustration of a set of example scenarios presenting a few variations in the types of protected details 116 that may be revealed by various types of errors 118 and error messages 122. In a first example scenario 700, a protected detail 116 is stored as a value 702 of a record in a 32-bit unsigned integer format, where the largest representable value 702 is 2,147,483,647. While queries 110 may be unable to access the integer directly, such queries may attempt to apply various multiplication operations on the value 702 in order to identify a point where a mathematical overflow error occurs. Accordingly, a first query 110 may include an instruction that multiplies the value 702 by 71,582,789 (which causes values of 30 or larger to overflow), and may result in an access prohibited error message 704. A second query 110 may include an instruction that multiplies the value by 107,374,183 (which causes values 702 of 20 or larger to overflow), and may also result in an access prohibited error message 704. A second query 110 may include an instruction that multiplies the value 702 by 214,748,366 (which causes values 702 of 10 or larger to overflow), which may now result in a 32-bit overflow error message 706. The different error messages 706 may therefore reveal that the protected detail 116 comprises a stored number between 10 and 19, even though the queries 110 are not permitted to return the protected detail 116 directly.

As a second example scenario 708, the protected detail 116 may comprise an object naming policy that defines the permitted names of objects in the data set 104. An attacker may consider performing a brute-force guessing session against a data set to identify some or all of the existing objects in the data set 104, and the size of the namespace may determine the amount of time needed to identify the objects. An attacker may therefore benefit by determining the object naming policy of the data set 114, which may enable the brute-force guessing to avoid guessing object names that are not valid according to the object naming policy, thereby accelerating the success and completion of the brute-force guessing session. In some cases, the details 116 of some error messages 112 may unintentionally yield such information. This information may be gleaned by a set of sample requests 710 that are provided to the data set 114, and an evaluation of the error messages 114 that may reveal the object naming policy of the data set 114. A set of requests 710 may be submitted, each containing one unusual character, and the requests 710 that return the first error message 712 may together identify the illegal symbols according to the object naming policy of the data set 114.

As illustrated in the second example scenario 708, a first request 710 may request an object with a name containing a particular symbol, such as a hash symbol, and the data set 114 may return a first error message 712 indicating that the symbol is not permitted. A second request 710 may request an object with an overly long name, and the data set 114 may return a second error message 714 indicating that the specified object name is too long. Further requests 710 may be submitted that incrementally reduce the object name by one character until the second error message 714 is no longer returned. A third request 710 may omit both such properties, and the data set 114 may return a third error message 716 indicating that the specified object is not found, thereby confirming valid object names. In this manner, the error messages 122 collectively reveal the object naming policy as a protected detail 116 of the data set 114 that may subsequently be exploited.

As a third example scenario 718, the protected detail 116 may comprise a set of relationships between tables a data set 104. A first query 110 may comprise a first request 720 to drop a first table, and may result in an access denial error message 722 due to the user's lack of permission to alter the specified table. However, a second query 110 may comprise a second request 720 to drop a second table, and may result in a relational key error message 724 indicating that a table cannot be dropped without first removing the foreign key dependency, and may even reveal the name of the dependent table that depends from the identified table. In this manner, the error messages 122 produced in response to various errors 118 may reveal a variety of potentially exploitable information about the data set 104, which may be addressed through the use of the techniques presented herein.

E3. Identifying Protected Details and Redacting Error Messages

A third aspect that may vary among embodiments of the presented techniques involves the manner of identifying and redacting protected details 116 from error messages 122.

As a first variation of this third aspect, a query processor 102 may evaluate the description 124 of an error message 122 in response to an error 118 arising while processing the query 110 to identify a protected detail 116 in the error message 122. For example, between the generation of an error message 122 and the presentation of the error message 122 in response to a query 110, a query processor 102 may examine the error message 122 for any protected details 116 that may be redacted to produce a redacted error message 206. Such protected detail detection 314 may include, e.g., detecting, within the error message 122, the protected detail 116 that includes an identifier of a resource of at least one of the data set 104 and the query processor 102, and redacting the identifier of the resource from the error message 122 to produce the redacted error message 206. The identifiers may comprise a name and/or location of a stored resource, and/or a value that is not to appear in any error message 122, such as anything resembling a password of an administrative account. Such techniques may also apply to any potentially existing resource of the query processor 102, such as the name of any file that may or may not exist in a file system of the query processor 102.

As a second variation of this third message, a query processor 102 may substitute an error message 122 with a generic error message 122 that reveals no information about the data set 104. For example, rather than indicating that a particular type of error 118 arose that involved a particular resource, the query processor 102 may simply provide an error message of a general type of error, or even a completely generic message indicating simply that an error occurred.

As a third variation of this third aspect, a query result provider 310 may notify an administrative user 112 of the redaction of various protected details 116 from various error messages 122 prompted by various types of errors 118 in response to various queries 110. Alternatively or additionally, a query result provider 310 may store a set of protected details 116 that have been redacted from various error messages 122 in a protected location, such as an administrative log. An administrative user 112 may, by examining such reported redactions, understand the resources targeted by potentially malicious users 112 and/or scripts, and/or the attack vectors utilized thereby, which may facilitate the user 112 in a proactive and/or counteractive defense of the query processor from exploitation.

Figure 8:
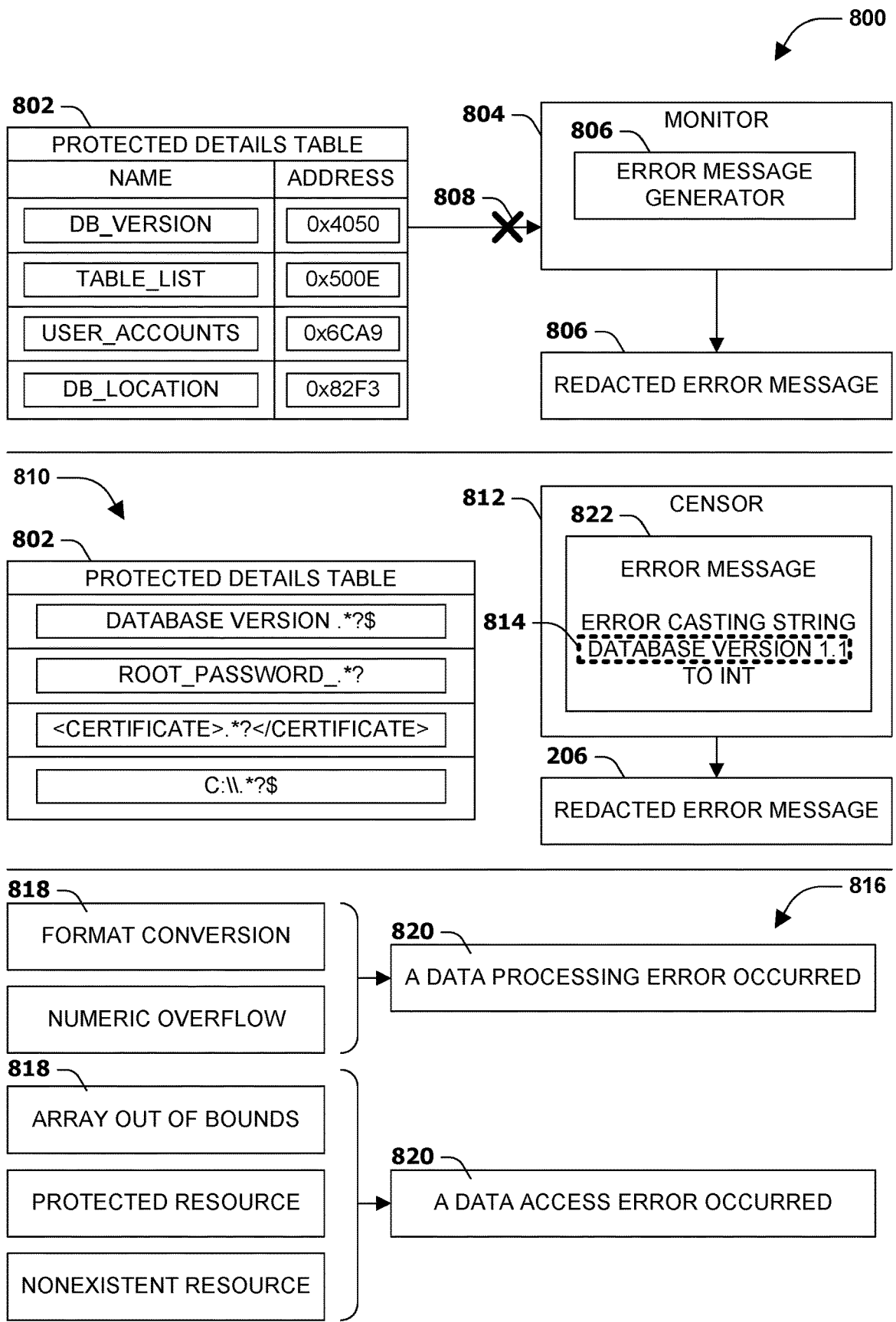
FIG. 8 is an illustration of various example scenarios for identifying a protected detail in the description of an error message of an error, in accordance with the techniques presented herein.

FIG. 8 is an illustration of set of example scenarios featuring the identification of protected details 116 in various error messages 122 and the redaction thereof. In a first example scenario 800, a query processor 102 may feature a protected details table 802 that specifies protected details 116 according to a symbol name and/or address. While an error message generator 806 generates an error message 122, a monitor 804 may evaluate the resources that are utilized in the processing of the query 110 and/or the generation of the error message 122, and may identify that such symbol names and/or addresses have been accessed in a manner that may incorporate them into the redacted error message 206. The monitor 804 may therefore block 808 such access in order to avoid including such protected details 116 in the redacted error message 206.

In a second example scenario 810, a protected details table 802 may comprise a set of regular expressions that identify values that are not to appear in any error message 122, such as any string that indicates the database version; any string that resembles a portion of an administrative password; the contents of any certificate; and/or the filename and/or path of any locally stored file in the file system of the query processor 102. When an error message 122 is prepared in response to a query 110, a censor 812 may evaluate the regular expressions against the description 124 of the error message 122 to identify any matching strings 814, which may then be removed to produce the redacted error message 206.

In a third example scenario 816, a set of specific error messages 818 may be provided that may be generalized into one or more generic error messages 820 that, while generally connoting the type of error, do not provide exploitable information about the precise nature of the error. Such generalization may avoid the disclosure of protected details 116 such as in the example scenarios of FIG. 7. Many such techniques may be utilized to identify the presence of protected details 116 in error messages 122, and to achieve reaction and production of redacted error messages 206 that may be provided in response to a query 110, in accordance with the techniques presented herein.

E4. Selective Application of Error Message Reaction

A fourth aspect that may vary among embodiments of the techniques presented herein involves a selective application of such techniques in particular circumstances. For example, it may be desirable to limit the redaction of error messages 122 to errors 118 and circumstances that are likely to pose a risk of revealing protected details 116 to unauthorized users 112, while refraining from redacting error messages 122 where such risks may be less prevalent and/or may be outweighed by providing a full description 124 of the error 118.

As a first variation of this fourth aspect, a first error message 122 may be produced by a first error 118 while processing the query 110, where the first error 118 provides debugging information about processing the query. A second error message 122 produced by a second error 118 while processing the query 110, where the second error 118 provides protected details 116 about the data set 104. The techniques presented herein may be selectively applied to redacting the protected detail 116 from the second error message 122 in response to the second error 118, while preserving the debugging information in the first error message 122 in response to the first error 118, which may only reveal information that users 112 less capable of exploiting.

As a second variation of this fourth aspect, errors 118 may arise during various stages of query evaluation, such as a compiling phase that involves compiling the query 110 for execution (during which errors are likely to involve the syntax of the query 110 rather than any protected detail 116 of the data set 104), and an execution phase that involves executing the query 110 against the data set 104. In such scenarios, it may be desirable to configure a query result provider 310 to redact error messages 122 and to produce redacted error message 206 for errors 118 that arise during the execution phase, which may reveal protected details 116 about the data set 104, and to refrain from redacting error messages 206 to produce the redacted error message 206 when errors 118 that arise during the compiling phase, during which the data set 104 is not yet accessed and is not likely to be compromised by the revelation of protected details 116.

As a third variation of this fourth aspect, a query processor 102 may further comprise an administrative interface that permits an administrative user 112 to select a query processor security option to apply to the query processor 102, such as a toggle option that enables the examination and redaction of error messages 122 to be toggled on or off. A query result provider 310 may examine error messages 122 and/or redact protected details 116 therefrom to produce the redacted error messages 206 only on condition of the query processor security option being selected for application to the query processor 102.

As a fourth variation of this fourth aspect, a query processor 102 may execute in a query processing context indicator, which may be selected from a query processing context indicator set comprising a development context indicator that indicates that query processor 102 is executing in a development environment, and a production context indicator that indicates that query processor 102 is executing in a production environment. The examination of error messages 122 and/or redaction of protected details 116 may be applied only on condition of the production context indicator being selected as the query processing context indicator.

As a fifth variation of this fourth aspect, a query processor 102 may further comprises a variety of resources, including a secured resource (e.g., a low-security, publicly readable and writable table) and an unsecured resource (e.g., a high-security, publicly restricted table). A query result provider 310 may redact protected details 116 from error messages 122 to produce redacted error messages 206 only on condition of the protected detail 116 involving a secured resource, and may otherwise refrain from redacting details from error messages 122 that only involving unsecured resources. Alternatively, a query result provider 310 may redact such details from error messages 122 to produce the redacted error messages 206 irrespective of whether such details involves the secured resource or only unsecured resources, as previously unknown techniques for exploiting an unsecured resource may enable a further exploit of protected resources (e.g., a privilege escalation vulnerability that grants a user 112 and/or query 110 permission to access a protected resource of the data set 104).

As a sixth variation of this fourth aspect, respective queries 110 may be submitted by one of a privileged user 112 (e.g., an administrator or developer) and an unprivileged user 112 (e.g., a public account user). A query result provider 310 may redact protected details 116 from error messages 122 to produce redacted error messages 206 only for queries 110 submitted by unprivileged users 112, and may refrains from redacting protected details 116 from error messages 122 to produce redacted error messages 206 for queries 110 submitted by privileged users. Many such techniques may be devised for a selective application of the techniques presented herein in various embodiments thereof.

F. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. One or more components may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A device that evaluates a query over a data set, the device comprising:
a processor; and
a memory storing instructions that, when executed by the processor, cause the device to evaluate the query to produce a query result;
on condition of evaluation of the query producing the query result without an error, provide the query result; and
on condition of evaluation of the query producing an error message describing an error arising from processing the query:
redact, from the error message, a protected detail about the data set to produce a redacted error message comprising at least a portion of the error message;
present the redacted error message in response to the query; and
store the protected detail redacted from the error message in a protected location.

2. The device of claim 1, wherein redacting the protected detail from the error message further comprises: evaluating contents of the error message responsive to the error arising while processing the query to identify the protected detail in the error message.

3. The device of claim 1, wherein redacting the protected detail from the error message further comprises:
detecting, within the error message, the protected detail that includes an identifier of a resource of at least one of the data set and the device; and
redacting the identifier of the resource from the error message to produce the redacted error message.

4. The device of claim 3, wherein redacting the identifier from the error message further comprises: generalizing the error message to apply to any possibly existing resource of the processor.

5. The device of claim 1, wherein:
executing the instructions further causes the device to present an administrative user to select a query processor security option to apply to the query processor; and
redacting the protected detail from the error message further comprises: redacting the protected detail to produce the redacted error message only on condition of the query processor security option being selected for application to the query processor.

6. The device of claim 1, wherein:
executing the instructions further causes the device to select a query processing context indicator from a query processing context indicator set comprising:
a development context indicator that indicates that query processor is executing in a development environment, and
a production context indicator that indicates that query processor is executing in a production environment; and
redacting the protected detail further comprises: redacting the protected detail from the error message to produce the redacted error message only on condition of the production context indicator being selected as the query processing context indicator.

7. The device of claim 1, wherein:
the data set further comprises:
a secured resource, and
an unsecured resource;
redacting the error message further comprises: redacting the protected detail from the error message to produce the redacted error message irrespective of whether the protected detail involves the secured resource or the unsecured resource.

8. The device of claim 1, wherein:
the data set further comprises:
  a secured resource, and
  an unsecured resource;
redacting the protected detail further comprises:
  redacting the protected detail from the error message to produce the redacted error message on condition of the protected detail involving the secured resource; and
  refraining from redacting the protected detail from the error message to produce the redacted error message on condition of the protected detail only involving the unsecured resource.

9. The device of claim 1, wherein:
respective queries are submitted by one of:
  a privileged user, and
  an unprivileged user;
redacting the protected detail further comprises:
  redacting the protected detail from the error message to produce the redacted error message for queries submitted by the unprivileged user; and
  refraining from redacting the protected detail from the error message to produce the redacted error message for queries submitted by the privileged user.

10. A method of causing a device to provide a query result in response to a query over a data set, the method comprising:
  evaluating the query to produce the query result;
  on condition of evaluation of the query producing the query result without an error, providing the query result; and
  on condition of evaluation of the query producing an error message describing an error arising from processing the query:
    redacting, from the error message, a protected detail about the data set to produce a redacted error message comprising at least a portion of the error message;
    presenting the redacted error message in response to the query; and
    storing the protected detail redacted from the error message in a protected location.

11. The method of claim 10, wherein:
a first error message produced by a first error while processing the query provides debugging information about processing the query;
a second error message produced by a second error while processing the query provides the protected detail about the data set; and
producing the redacted error message further comprises:
  redacting the protected detail from the second error message in response to the second error, while preserving the debugging information in the first error message in response to the first error.

12. The method of claim 10, wherein:
the error further comprises a logical error arising from a logical operation applied to a value of the data set; and
the protected detail of the error message further comprises information about the value associated with the logical error.

13. The method of claim 10, wherein:
the error further comprises a formatting error arising from a formatting request applied to a value of the data set; and
the error message further reveals existence of the value associated with the formatting error.

14. The method of claim 10, wherein:
the error further comprises a resource error involving a resource of the device; and
the protected detail further reveals exploitable information about the device arising from the resource error.

15. The method of claim 10, wherein:
the error further comprises a relational error arising from a relational operation involving a relation between a first resource and a second resource; and
the protected detail further reveals exploitable information about the relation between the first resource and the second resource.

16. The method of claim 10, wherein the error arises during at least one of:
  a compiling phase that involves compiling the query for execution; and
  an execution phase that involves executing the query against the data set.

17. The method of claim 10, further comprising:
  redacting the protected detail from the error message to produce the redacted error message for errors arising during an execution phase; and
  refraining from redacting the protected detail from the error message to produce the redacted error message for errors arises during a compiling phase.

18. A method of causing a device to provide query results in response to queries submitted by clients over a data set managed by a data server, the method comprising:
  on condition of receiving a query from a client, transmitting the query to the data server for evaluation on behalf of the client;
  on condition of receiving from the data server, responsive to the query, an evaluation of the query producing the query result without an error, transmitting the query result to the client; and
  on condition of receiving from the data server, responsive to the query, an error message describing an error arising from processing the query:
    redacting, from the error message, a protected detail about the data set to produce a redacted error message comprising at least a portion of the error message;
    transmitting the redacted error message to the client in response to the query; and
    storing the protected detail redacted from the error message in a protected location.

* * * * *